July 26, 1966  TATSUYA TAKAGI ETAL  3,262,140
METHOD AND CONTRIVANCE OF MACHINING PIPE JOINTS
Filed March 12, 1964  2 Sheets-Sheet 1
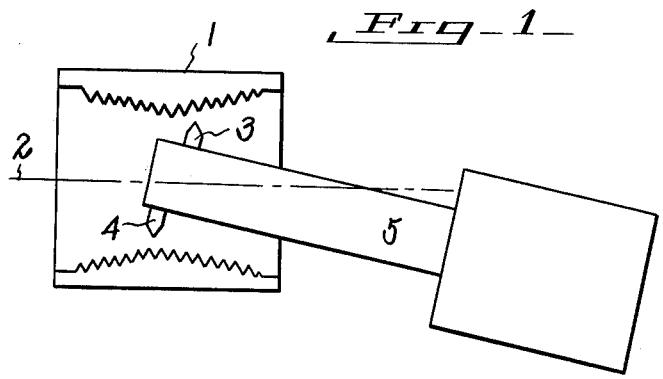
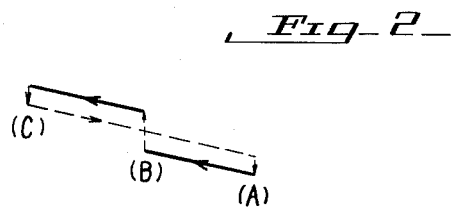
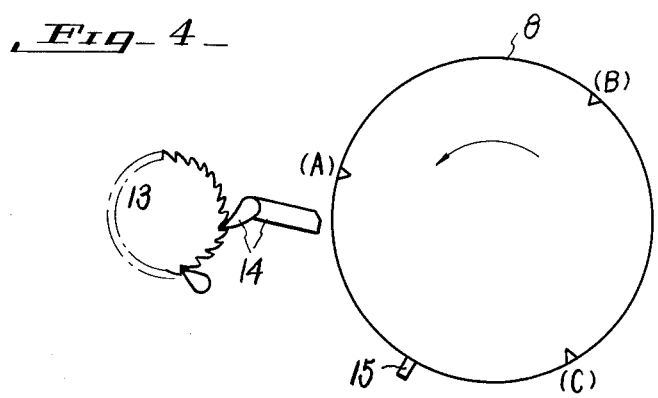
INVENTOR
TATSUYA TAKAGI
TERUYA TAKAGI
BY
ATTORNEYS

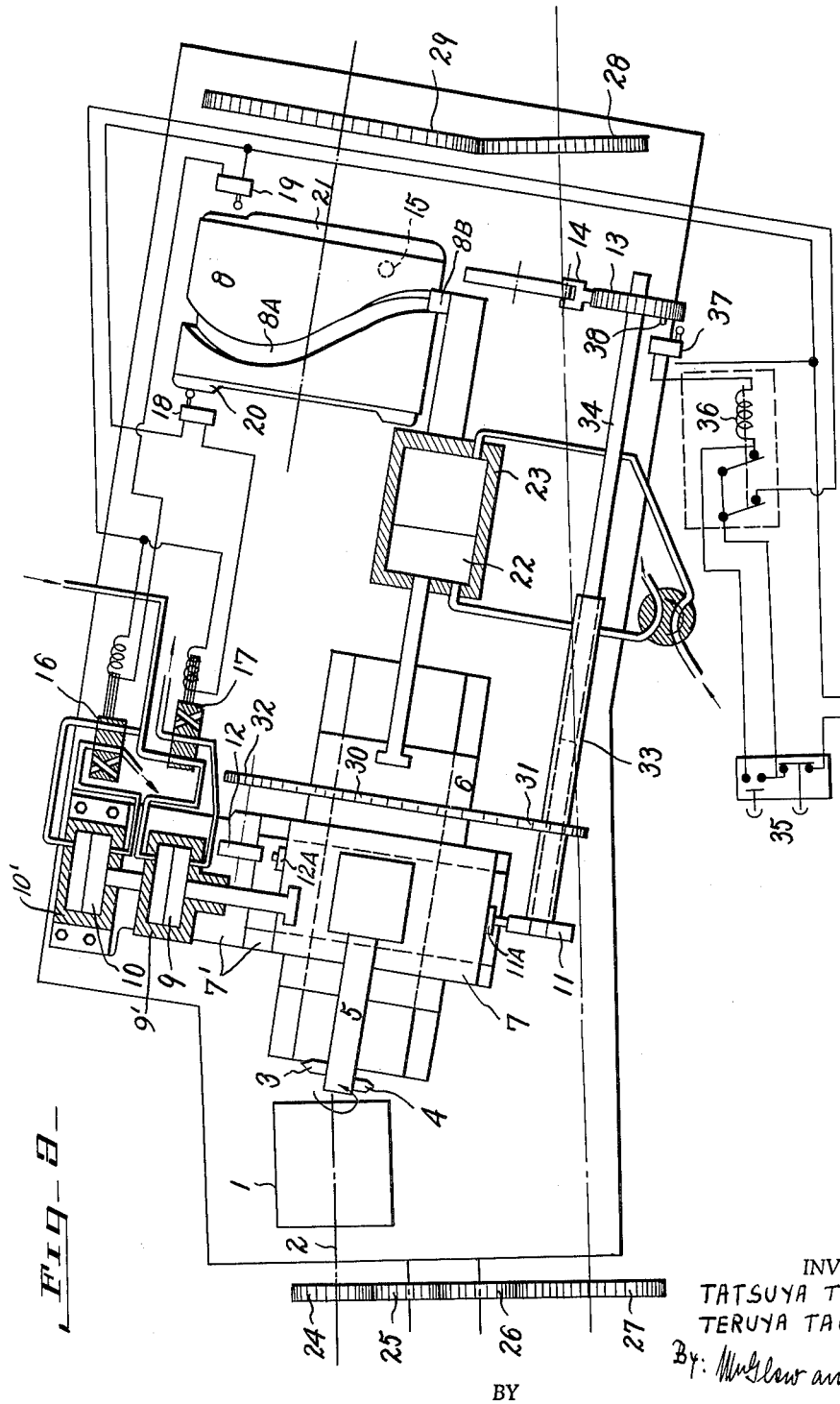

United States Patent Office 3,262,140
Patented July 26, 1966

3,262,140
METHOD AND CONTRIVANCE OF MACHINING PIPE JOINTS
Tatsuya Takagi, 46 Araebisu, and Teruya Takagi, 49 Araebisu, both of Nishinomiya-shi, Japan
Filed Mar. 12, 1964, Ser. No. 351,363
Claims priority, application Japan, Dec. 23, 1963, 38/68,957
4 Claims. (Cl. 10—101)

This invention relates to a method and contrivance of machining metallic articles such as tapered screw joints of steel pipings for oil wells.

Such pipe joints must satisfy the requirements for appropriate strength of the couplings and straightness thereof (viz. straightness of the axial line of the tapered screw, or the so-called alignment). Besides, they require a high accuracy in the perfect coincidence of forms, pitches and tapers between male and female threads, in order that they may pass the pressure test for proving water-tightness. Further, there is a problem in machining a slidable surface therebetween because of the materials being steels of high tensile strength as a rule.

Several kinds of such machining methods have heretofore been proposed but very few have been applied in the practical field up to the present, among which Cri-Dan's method is widely adopted as being suitable in many countries.

In the abovementioned Cri-Dan's method, the machining is performed by means of a thread form cutting tool having a single edge made of super hard alloy; the cutting action being automatically repeated from a few to ten or more times. The workpiece has to be regripped midway of machining because the cutting performance for each half section of the pipe joint has to be repeated twice in finishing one workpiece. This results in greater manhour requirements, and frequent occurrence of imperfect continuations of the thread at the midpoint of the pipe joint due to the cutting being performed from both sides thereof. In addition, there are more chances of having products rejectable from the standpoint of alignment. If these inferior goods were to be saved, more man-hours would be necessary to machine more precisely the external surfaces over which the raw material is to be gripped.

An object of the invention is to provide a method and apparatus for machining double tapered pipe couplings and which is free of the disadvantages of the prior art methods and apparatuses as noted above.

For an understanding of the principles of the invention, reference is made to the following description of a typical embodiment as illustrated in the accompanying drawings.

In the drawings:

FIG. 1 is a somewhat diagrammatic longitudinal sectional view illustrating a double taper pipe coupling being machined in accordance with the method of the invention and further illustrating the cutting tool of the invention and its mounting and feeding means;

FIG. 2 is a diagram showing the motion of the cutting tool;

FIG. 3 is a schematic representation of an embodiment of the contrivance according to this invention; and FIG. 4 illustrates the phase relation of the cam arrangement, the device being seen from the rear side thereof.

Referring to FIGS. 1 through 4, the double taper coupling to be machined or threaded is illustrated at 1, and the main work rotating spindle is indicated at 2. Cutting tools or bits are mounted at the front end of a suitable holder 5, the tools or bits 3 and 4 extending in diametrically opposed directions from the holder 5. It will be noted, particularly from FIGS. 1 and 3, that the longitudinal center line or direction of feeding and retractive movement of the holder 5, extends at an angle to the axis of the main spindle 2 equal to the taper angle of the interior surface of coupling 1.

Holder 5 is supported for movement in the feeding direction and also for adjustment as to depth of cut in the following manner. A guide 6 is provided, and its center line extends substantially parallel to the direction of feed of the holder 5. A slide 7′ is slidably mounted on the guide 6 for adjustment in the cutting tool feeding direction, and slide 7′ acts as a guide for a slide 7 which is mounted on slide 7′ for adjustment longitudinally of the latter in a direction to adjust the depth of cut. The tool holder 5 is mounted on the slide 7.

Slide 7′ is secured to the rod of a piston 22 displaceably mounted in a cylinder 23, and cylinder 23 is provided with a cam follower 8B engaged in a cam groove 8A of a cam 8 for effecting longitudinal feeding of the cutting tools 3 and 4. The depth of cut is controlled by fluid pressure operated pistons 9 and 10 which operate in cylinders 9′ and 10′, respectively, in cooperation with control cams 11 and 12 each having a plurality of surfaces corresponding to the respective depths of cuts. Cams 11 and 12 cooperate with stops or abutments 11A and 12A, respectively, on the depth of feed controlling slide 7.

Cam 11 is rotated by a sprocket 31, and cam 12 is rotated by a sprocket 32, and sprockets 31 and 32 are operated in synchronism by virtue of an interconnecting chain 30 engaged with sprockets 31 and 32. Sprocket 31 is secured to a sleeve 33, in turn secured to cam 11, and sleeve 33 is splined to a shaft 34 for conjoint rotation with the latter while being axially displaceable relative thereto. As best seen in FIGS. 3 and 4, a ratchet gear 13 is secured to rotate with shaft 34 and is operated by a pawl 14 which is periodically actuated by a pin or abutment 15 on the periphery of feeding cam 8.

The piston rod of piston 9 is secured to cutting depth control slide 7, and the piston rod of piston 10 is secured to cylinder 9′. The operations of pistons 9 and 10 are controlled by electromagnetically operated change-over valves 17 and 16, respectively. Operation of valve 17 is controlled by a microswitch 18, and operation of valve 16 is controlled by a microswitch 19. Microswitch 18 is controlled by a cam surface 20 on cam 8, and microswitch 19 is controlled by a cam surface 21 on cam 8. Cam 18 is rotated from spindle 2 through a gear train comprising gears 24, 25, 26, 27, 28 and 29, gear 25 being secured to rotate with cam 8.

Control of the apparatus is effected by a switch assembly 35 including a start switch and a stop switch. When the normally open start switch is closed momentarily, it energizes a magnetic contactor of switch 36 which transfers its contacts to the position shown in FIG. 3 to close a holding circuit through the stop switch of switch assembly 35. This holding circuit is under the control of a microswitch 37 which is operated by a pin or abutment 38 on ratchet wheel 13 once during each revolution of the ratchet wheel, engagement of stop or abutment 38 with microswitch 37 opening the holding circuit for magnetic contacter 36. This holding circuit is also carried through the normally closed stop switch of switch assembly 35.

Referring to FIGS. 2 and 4, the start position of the thread cutting operation is indicated A, the intermediate position, halfway along the length of coupling 1, is indicated at B, and the terminal position is indicated at C. FIG. 2 shows the course of travel of the tool holder 5, whereas FIG. 4 illustrates the corresponding positions of the feeding control cam 8. It will be noted that, in the direction of rotation of cam 8, abutment 15 operates pawl 14 to advance ratchet gear 13 by one tooth following attainment of the terminal feeding position C.

The described apparatus operates in the following manner.

A workpiece 1 is secured on the main spindle 2 by means of a chuck, and the spindle is driven in a high speed rotation. The rear cutting tool or bit 3 and front cutting tool or bit 4 are adapted to make to and fro motions in a direction inclined to the axis of spindles at an angle corresponding to the taper to be given to the pipe joint or coupling by means of the longitudinal feeding cam 8. In the beginning, the front cutting tool 4 will be engaged with the work to cut threads, and thus it will arrive at the middle point of the coupling 1 (position B). Then the electromagnetic valves 16, 17 will be actuated to shift the longitudinally slidable base 7 and the rear cutting tool 3 will begin to cut the rear threads. When the cutting of rear threads has been finished (point C), the slidable base 7 will again be shifted through the neutral position, where neither of the tools 3 or 4 engages the workpiece, back to the initial position (position A). (Both cutting tools 3 and 4 are originally fixed to keep a certain phase relation so that the pitches of the threads of both the rear and front parts coincide with each other.)

The foregoing cycle is repeated from a few to ten or more times to obtain the desired depth of thread. Intermediate successive cycles, the cutting tools 3 and 4 are advanced stepwise to increase the depth of cut in each cycle as compared to the depth of cut in the immediately preceding cycle. After the required depth of cut is obtained, abutment 38 opens microswitch 37 to deenergize the apparatus. Fluid pressure on the piston 22, which normally is applied in such a manner as to maintain this piston 22 in the extreme forward position, is now reversed to retract the piston 22 and thus to retract support 5 and the cutting tools 3 and 4 so that the workpiece 1 may be removed. Cam 8, through its gear arrangement coupling it to spindle 2, controls the pitch of the thread to be cut.

The hydraulically or pneumatically operated pistons 9, 10 are advantageously mounted on the slide base 7' for controlling the depth of cut, in a coaxial connection as shown in FIG. 3. In the arrangement as above, each piston makes the same stroke (about 6 mm.), with the cylinder 10' of the piston 10 is fixed to the sliding bed 7' and an end of the piston rod of piston 9 to the slide base 7. The microswitch 18 is adapted to be closed for phase A–B, to be opened for phase B–C and to be closed for phase C–A by means of the cam surface 20, whereby, in FIG. 1, the piston 9 is front fed moving forwardly for phase A–B, rearwardly for phase B–C, and again forwardly for phase C–A. Similarly, the piston 10 is adapted to be back fed forwardly for phase A–B, but rearwardly for phase B–C and also for phase C–A. Thus a cyclic motion as shown in FIG. 2 will result by combining the above motions. Control of piston 10 is effected by switch 19 operated by cam surface 21.

Cams 11, 12 for controlling the cutting feed make the same rotation by the inter-coupling of the chain 30. The extended shaft 33 of the spindle of the cam 11, adapted to be longitudinally slidable relative to shaft 34 by means of the splined engagement therebetween, is set in rotation by the ratchet wheel 13 which is stepped once each cycle by pawl 14 operated by protrusion 15 to cause a decrease of radii of cams 11 and 12 thereby increasing the cutting feed. At the end of phase B–C, the cutting feed is operated to retract the cutting tools to the neutral position. During the phase C–A, the tools remain in the neutral position and, at the end of phase C–A, the cutting feed is operated to restore the initial position of the cutting tools.

The micro-switch 37 is adapted to open momentarily after the last cutting, by means of the protrusion 38 provided on one side of the ratchet wheel 13, whereby the coil circuit of the magnetic switch 36 is interrupted and both the micro-switches 18, 19 are cut off from the power source at the same time the power supply for the motor to drive the main shaft is interrupted to automatically stop all the parts associated therewith.

The motor for the main driving shaft may again be set in rotation if the starting button switch 35 be pushed again to close, through the magnetic switch 36, the operating circuit of the micro-switches 18 and 19.

In place of the coaxial arrangement of the feeding pistons 9 and 10 as shown in FIG. 3, the slide bases, arranged as two separate bases, may be fed by means of two pistons respectively.

As may be seen from the above description, the method and contrivance according to this invention are so effective that machining of both tapered thread sections is efficiently performed without regripping the workpiece in the middle point of machining, and that a perfect alignment is assured even if the workpiece is machined on the unground surface of a blank, such as the thinner wall of the blank pipe whereby man-hours for machining work and weight of raw materials will be saved which results in a considerable reduction in the pipe joint. Further, as the cutting tools can be fitted into the holder to coincide with the pitch of the thread, the threads on both halves of the joint or coupling will be smoothly continued without producing any interrupted part in the middle thereof.

According to the API Standard of U.S.A., the dimension of the external diameter of the pipe joint is specified as a rule as the size in the unground rolled state, so that if the pipe joint needs machining of its external surface, it is necessary to use blank material in a rolled size larger by one gauge number, because there is no size of material larger by just the shaving tolerance than the standard size.

In machining a pipe joint or coupling by means of a composite bite with multiple edges in the prior art, the cutting pressure at the part near the exit decreases in accordance with the cutting tool retracting from the end surface of the workpiece, so that the resetting of the elastic deformation of the bit or tool holder and the main spindle influences the remaining bit or tool. As a result, a defect is frequently found in that the exit of the pipe coupling becomes gradually wider like a trumpet (joints having such a defect could not pass the API Standard). On the contrary, according to the present invention, a single-pointed tool is used so that undesirable widening of the tapered part of the coupling is avoided.

High speed cutting with the aid of a tungsten carbide chip tool is necessary for cutting and finishing such high strength material as 5AX casing pipe by API Standards. The most important requirements for the high speed cutting, as stated above, are that the rigidity of the machine is sufficiently high, and the clearances between machine elements thereof are very small.

Thus the known method, wherein the cutting tool is slidably mounted in the tool holder is not applicable for machining high strength material as previously mentioned. According to the present invention, both cutting tools are fixedly mounted on the tool holder, while the tool holder is attached to a slide base which is moved along a predetermined path. Thus, a mechanism for relieving the tools is provided, and not only does the rigidity of the machine become very high but also the clearances between elements of the machine are very small so that efficient high speed cutting can be performed.

What we claim is:

1. Method of machining a thread on a tubular workpiece, such as a pipe coupling, having tapered coaxial threads increasing in diameter outwardly from their junction intermediate the ends of the workpiece, said method comprising: rotating the workpiece about its axis at a high angular velocity; arranging a relatively elongated tool support for longitudinal reciprocation through the workpiece in a feeding direction intersecting the axis of the workpiece at an angle equal to the angle of taper of the thread; fixedly positioning a pair of cutting tools on the support in fixed longitudinally spaced relation therealong and projecting laterally in opposed first and second directions therefrom; shifting the support laterally in such first direction to engage one cutting tool with the work at the entrance end of the work; advancing the support in the feeding direction through the work at a rate coordinated with the angular velocity of the work to cut a thread extending from said entrance end to said junction; shifting the support in such second lateral direction to engage the other cutting tool with the work while continuing the advance of the support in the feeding direction to continue the cutting of the thread from the junction to the exit end of the workpiece; shifting the support in such first direction an amount sufficient to disengage both cutting tools from the work; and retracting the support through the workpiece in the direction opposite to the feeding direction.

2. Method of machining a thread, as claimed in claim 1, including the step of cyclically repeating the thread cutting operation while increasing the depth of cut between each cyclical repetition of the thread cutting operation.

3. Apparatus for machining a thread on a tubular workpiece, such as a pipe coupling, having tapered coaxial threads increasing in diameter outwardly from their junction intermediate the ends of the workpiece, said apparatus comprising, in combination, means mounting the workpiece for rotation about its axis at a high angular velocity; means mounting a relatively elongated tool support for longitudinal reciprocation through the workpiece in a feed direction intersecting the axis of the workpiece at an angle equal to the angle of taper of the threads; a pair of cutting tools fixedly positioned on said support in fixed longitudinal spaced relation therealong and projecting laterally in opposed first and second directions therefrom; means operatively associated with said support and operable to shift said support laterally in such first direction to engage one cutting tool with the work at the entrance end of the work; means operatively associated with said support and operable to advance the such support in the feeding direction through the work at a rate coordinated with the angular velocity of the work to cut a thread extending from said entrance end to said junction; means operatively associated with said support and operable to shift the support in such second lateral direction, as said one cutting tool reaches said junction, to engage the other cutting tool with the work during continued advance of said support in said feeding direction to continue the cutting of the thread from said junction to the exit end of the workpiece; said shifting means being operable, responsive to said other cutting tool reaching the exit end of the workpiece, to shift said support in such first direction an amount sufficient to disengage both cutting tools from the work; said advancing means, responsive to said other cutting tool reaching the exit end of the workpiece, retracting said support from the workpiece in a direction opposite to said feeding direction.

4. Apparatus as claimed in claim 3, including first control means controlling the advance and retraction of said support and controlling the first and second mentioned shifting means; means selectively operable to activate said first control means to initiate the thread cutting cycle and to repeat the thread-cutting cycle as long as said first control means is activated; second control means operatively associated with said shifting means and actuated by said first control means, immediately before the begining of each thread-cutting cycle, to operate said shifting means to increase the depth of cut for the next succeeding thread-cutting cycle; and means operable by said second control means, responsive to completion of a predetermined number of thread-cutting cycles, to deactivate said first control means.

References Cited by the Examiner
UNITED STATES PATENTS 1,958,530   5/1934   Bogart _____ 10—101

FOREIGN PATENTS 556,562   8/1932   Germany.
613,765   5/1935   Germany.

WILLIAM W. DYER, Jr., *Primary Examiner.*

F. T. YOST, *Assistant Examiner.*